March 18, 1969   R. GILMONT   3,433,077
COMPENSATED SYRINGE MANOMETER
Filed May 3, 1967

INVENTOR
ROGER GILMONT
BY
ATTORNEYS

United States Patent Office 3,433,077
Patented Mar. 18, 1969

3,433,077
COMPENSATED SYRINGE MANOMETER
Roger Gilmont, Douglaston, N.Y., assignor to Roger Gilmont Instruments, Inc., Great Neck, N.Y., a corporation of New York
Filed May 3, 1967, Ser. No. 635,847
U.S. Cl. 73—401   15 Claims
Int. Cl. G01l 7/18

ABSTRACT OF THE DISCLOSURE

A syringe manometer selectively connected to a closed pressure system and vent tube by means of a valve. In one position of the valve communication is effected between the manometer and both the closed pressure system and the vent tube for purposes of equalization. A second valve position provides communication between the manometer and the system alone, whereby the syringe of the manometer is manipulated to vary the internal volume thereof and accordingly maintain the indicating liquid in the manometer at a predetermined level, the degree of volume variation required over a predetermined period of time being indicative of the pressure change within the closed pressure system.

---

Figure 1:
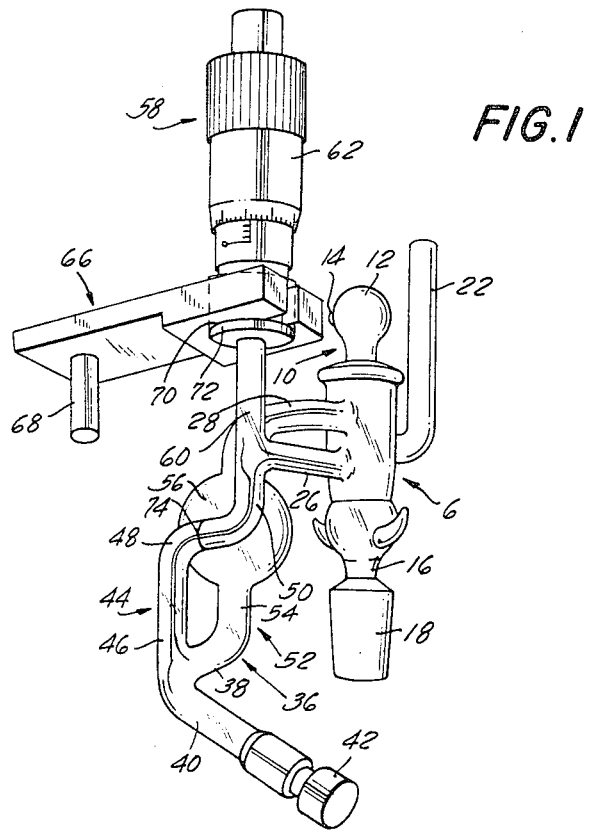

The present invention relates to the design of a syringe manometer which permits the attainment of a high degree of accuracy independent of barometric pressure and ambient temperature.

Syringe manometers are used for the measurement of pressure changes. One area in which their use is very frequent is in connection with biological experiments, such as those involving tissue respiration or photosynthesis. In experiments of this type the extent to which a given reaction has progressed is determined by the degree to which the gas pressure within a closed system varies, the variation in gas pressure thus being a measure of the degree to which gas has been either absorbed or produced by the reaction under investigation. Thus in tissue respiration experiments oxygen is taken in and carbon dioxide is produced by the tissue, and means are provided for absorbing the carbon dioxide as it is produced; hence the degree to which the gas pressure drops in the closed system is a measure of the extent to which respiration has taken place.

In order to measure such changes in pressure, which are usually relatively minute, a very sensitive measuring device must be employed. One such device is the syringe manometer, a manometer system in which a syringe (a device the volume contents of which can be accurately varied) is operatively connected to the closed pressure system, and the syringe is manipulated so as to vary the internal volume thereof in such a fashion as to maintain the indicating liquid in a manometer tube at a predetermined reference level. The degree to which the internal volume of the syringe is varied from one point in time to another, while the manometer indication is maintained at the aforementioned reference level, is a measure of the degree to which the pressure in the system has changed during the interval of time involved. If gas is evolved in the course of the experiment the system pressure will rise and consequently the internal volume of the syringe will be increased to compensate for that rise; if gas is absorbed in the course of the experiment the system pressure will fall and the internal volume of the syringe will be correspondingly decreased to compensate for that fall.

The reactions are usually carried out in a flask or other container of appreciable volume. One end of the manometer tube is operatively connected to that flask and the other end is connected to a reference pressure source, generally the atmosphere. In a system of that type any changes in atmospheric pressure during the time that the experiment is carried out will affect the readings and thus constitute a source of error. Similarly, variations in ambient temperature will act upon the gas within the flask so as to cause its pressure to vary, thus producing a pressure variation which does not reflect the course of the experiment being carried on and also constitutes a source of error. Moreover, a calibration is often required in connection with the existing ambient temperature even if it does not vary.

It is the prime object of the present invention to devise a syringe manometer which will function accurately independently of variations in atmospheric pressure and ambient temperature, but which will at the same time constitute a compact, readily immersible, sturdy and precise instrument which is at the same time relatively inexpensive.

To these ends I provide a manometer one end of which is adapted to be operatively connected to the syringe and to the reaction flask or other pressure source, the other end of the manometer tube being connected to an enlarged volume portion constituting a compensation bulb, preferably of a volume corresponding to that of the reaction flask. Valve means are provided for venting both ends of the manometer tube for zero-set purposes and for then closing the second-mentioned manometer tube end, sealing off the vent, and leaving the first-mentioned manometer tube end connected to the reaction flask. With the valve in its latter position the entire system, including the second-mentioned end of the manometer tube, is sealed off from the atmosphere, and hence variations in barometric pressure do not affect the readings of the instrument. Moreover, because the second-mentioned end of the manometer tube is connected to the compensation bulb changes in ambient temperature will substantially equally affect both ends of the manometer tube, and hence no change in reading will be produced thereby.

Immersion of the entire system is often desirable for further reducing the adverse effects of ambient temperature variation, and particularly such effects as might arise from differential action of the ambient temperature on different parts of the system. The difficulty in achieving total immersion of the reacting and measuring system is compounded as the overall size of the system increases. Agitation of the system is often desired to effect an equilibrium between the gaseous and liquid phases of the reaction system, and vibration and breakage problems increase markedly as the size of the overall equipment increases.

A major feature of the syringe manometer of the present invention is the arrangement of the parts so that a surprisingly high degree of compactness, sturdiness and rigidity is achieved without any sacrifice in accuracy. Further, the parts are so arranged that the operative pressure-detecting parts may be completely immersed while the device is supported by a non-immersed or only partially immersed clamp attached to a shaking mechanism and while the control elements are accessible for manipulation, those control elements comprising the element which varies the internal volume of the syringe and the element which controls the operative position of the valve.

Figure 2:
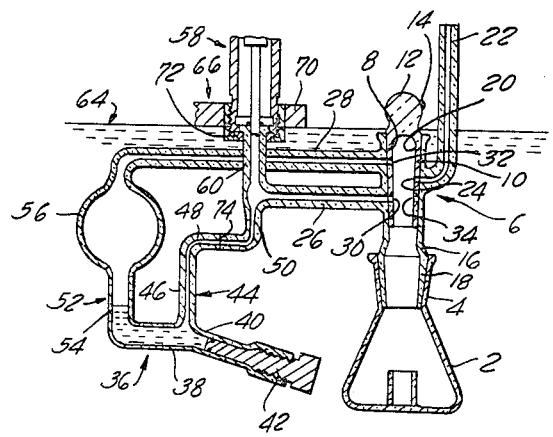

To the accomplishment of the above, and to such other objects as may hereinafter appear, the present invention relates to the construction and arrangement of a compensated syringe manometer, as defined in the appended claims and as described in this specification, taken together with the accompanying drawings, in which:

FIG. 1 is a three-quarter perspective view of a preferred embodiment of the present invention; and FIG. 2 is a semi-schematic view of the system shown in a single plane for clarity of illustration and shown immersed in a liquid bath.

The pressure source, changes in the pressure of which are to be measured, is here shown in the form of a typical reaction flask 2 designed to contain the reaction materials of a desired experiment. As is conventional, the flask 2 has an open neck 4.

The manometer system comprises a valve body generally designated 6 having an open-topped inner chamber 8 within which the valve control element 10 is received in sealing rotative relation, the control element 10 having an upwardly extending manually accessible part 12 provided with an indicator element 14 such as a colored protrusion. Depending from the valve body 6 is a pressure source tube 16 terminating in a hollow stopper-like part 18 adapted to be sealingly received in the open neck 4 of the reaction flask 2. The pressure source tube 16 communicates with the hollow interior 20 of the valve control element 10.

An open-ended vent tube 22 extends out laterally and then upwardly from a side of the valve body 6, and the valve control element 10 is provided with a port 24 adapted to register with the central passage of the vent tube 22 when the valve control element 10 is in its position shown in FIG. 2, but to be out of registration therewith when the valve control element 10 is rotated from its position shown in FIG. 2 to its angularly related position shown in FIG. 1.

Also extending out from the side of the valve body 6, preferably at a location angularly related relative to the vent tube 22, are first and second conduit means 26 and 28 respectively. The valve control element 10 is provided with a pair of ports 30 and 32 which, when the control element 10 is in its operative position shown in FIG. 2, register with the conduits 26 and 28 respectively, the valve control element 10 having another port 34 which is adapted to register with the first conduit means 26 when the control element 10 is in its second operative position shown in FIG. 1.

The manometer, generally designated 36, comprises a short comparatively wide bore horizontal tube section 38 to which a tube section 40 communicates, the section 40 having its open end closed by an adjustment screw 42 threadedly receivable therein so as to be adjustably positionable along the length of the tube section 40. Extending up from the right hand end of the tube section 38 is a first manometer tube end generally designated 44 and comprising a vertical section 46, a horizotnal section 48 and a vertical section 50, all having communicating small bores. Extending up from the left hand end of the tube section 38, and comprising the second manometer tube end generally designated 52, is a substantially wide bore vertical section 54. Mounted on the upper end of the tube section 54 and in fluid communication therewith is a compensation bulb section 56 the volume of which is preferably chosen to be the same or substantially the same as that of a typical recation flask 2. The conduit means 28 communicates with the upper end of the compensation bulb section 56. The conduit means 26 communicates with the upper end of the second vertical section 50 of the first manometer tube end 44.

A syringe generally designated 58, and here shown as of the type disclosed in my Patent No. 3,232,117 of Feb. 1, 1966 entitled "Micrometer Syringe," is operatively connected to the conduit means 26 by means of tube 60. The syringe 58 is provided with a rotatable control element 62 which, when rotated, causes a piston to move up or down within the cylinder of the syringe 58, thereby to vary its internal volume, all as is described in detail in the aforementioned Patent No. 3,232,117.

It will be noted that the syringe 58, the upper portion of the vent tube 22 and the valve control element 12 are all located above a level corresponding approximately with the top of the valve body 6, and that the remaining portions of the system are located below that level. Hence, as illustrated in FIG. 2, the system may be immersed in a bath, generally designated 64, so that those parts thereof which must be manipulated—the control elements 12 and 62 for the valve 6 and syringe 58 respectively—are available for manipulation and with the open end of the vent tube 22 located outside the bath 64, but with virtually the entire operative gas-containing portions of the system immersed within the bath 64. Moreover, as is best seen from FIG. 1, all of the parts are very closely positioned relative to one another, with the lengths of the conduit means 26 and 28 and of the manometer tube 36 being minimized, thereby to make for ease of handling and to produce strength and vibration resistance when subjected to agitation. The system is adapted to be supported by means of a clamp 66 one end 68 of which is adapted to be connected to any standard shaking mechanism and the other end 70 of which may be clamped about the base portion 72 of the syringe 58, thereby reliably to support the entire system.

One manner of use of the invention of the present system is as follows: The manometric fluid is inserted into the tube 36 by removing the adjustment screw 42 and pouring in the appropriate amount of manometric fluid through the tube 40. The screw 42 is put back in place and the reaction flask 2 is placed on the part 18. The valve control element 12 is moved to its position shown in FIG. 2, in which the reaction flask 2 and both ends of the manometer tube 36 are vented to the atmosphere through vent tube 22. The adjustment screw 42 is adjusted until the meniscus of the manometer fluid in the first manometer tube end 44 is at the reference line 72 on the horizontal tube section 48. The vent tube 22 may also be used for introducing a specific gas into the reaction system if desired, or to degas or vacuumize the system, the latter usually being accomplished, when system immersion is involved, after the system has been thus immersed.

Thereafter the valve control element 10 is turned to its other operative position shown in FIG. 1, in which position the vent tube 22 and the conduit 28 are sealed off and the reaction flask 2 is connected via conduit 26 to the first end 44 of the manometer 36 and to the syringe 58. This may readily be accomplished while the system is immersed in the bath 64, since the control element 12 is located out of the bath 64.

The reaction may then be started and the absorption of gas followed by adjusting the control element 62 of the syringe 58, this also being easy to do while the system is immersed because that control element is located outside the bath 64. The syringe 58 is manipulated so as to maintain the meniscus of the manometric fluid at the reference line 74, and the degree to which it must be thus manipulated will be a measure of the change in pressure within the system.

Since the left hand end 52 of the manometer 36 is sealed off from the atmosphere by the valve 6 and since the vent tube 22 is likewise sealed off from the reaction flask 2 and the right hand end 44 of the manometer 36, the readings will be independent of any changes in barometric pressure. Moreover, any changes in ambient temperature will affect the gases in the reaction flask 2 and the compensation bulb portion 56 at the same time and, to the extent that the volumes of the reaction flask 2 and the compensating bulk portion 56 are the same, to the same extent, thereby preventing variations in ambient temperature from having any appreciable effect on the pressure measurement readings. The only appreciable source of error insofar as temperature is concerned will arise if a different temperature is applied to the reaction flask 2 than is applied to the compensating bulk 56, but immersion of the system, even in a bath which is not temperature controlled, will essentially eliminate any such effect. The compactness of the equipment is important in this regard, since, because the bulb 56 and flask 2 are positioned so close to one another, it is unlikely that the portions of the bath surrounding the compensating bulb 56 and the reaction flask 2 could have any significant difference in temperature. Moreover, when the system is shaken the compactness of the system makes for strength and sturdiness. All of this is accomplished with extreme simplicity of manipulation and without any sacrifice in the high degree of accuracy characteristic of the manometer arrangement per se.

While but a single embodiment of the present invention has been here specifically disclosed, many variations may be made therein, all within the scope of the instant invention as defined in the following claims.

I claim:

1. A compensated syringe manometer comprising a manometer tube having first and second ends, a pressure source tube, a vent tube, valve means, first and second conduit means connecting said first and second manometer tube ends respectively to said valve means, said vent tube and said pressure source tube being in fluid communication with said valve means, and syringe means in fluid communication with said first conduit and having a control element with a manually actuatable part, said second conduit means including an enlarged volume portion constituting temperature compensating means, said valve means having a control element with a manually actuatable part movable between first and second operative positions to connect said pressure source tube respectively to said first and second conduits and said vent tube and to said first conduit, said manually actuatable parts of said syringe control element and said valve control element being located above an imaginary horizontal plane passing through said manometer when said manometer is in operative position, said manometer tube, said first and second conduit means, including said enlarged volume portion thereof, said pressure source tube and that portion of said valve means connecting them being located below said imaginary horizontal plane, whereby those parts above said imaginary horizontal plane are available for manipulation while those parts located below said imaginary horizontal plane are adapted to be immersed in a liquid bath, the immersion of said enlarged volume portion of said second conduit means along with said pressure source tube providing for temperature compensation of said manometer.

2. The manometer of claim 1, in which said valve means comprises a main body from which said pressure source tube depends and to the sides of which said first and second conduit and said vent tube are connected, said valve control element extending above said main body.

3. The manometer of claim 2, in which the end of said venting tube opposite from said valve means is located above said given level.

4. The manometer of claim 2, in which said manometer tube comprises a short horizontal section, a narrow bore extension comprising said first manometer tube end and having a first vertical section, a horizontal section, and a second vertical section, and a wide bore vertical section comprising said second manometer tube end.

5. The manometer of claim 2, in which said manometer tube comprises a short horizontal section, a narrow bore extension comprising said first manometer tube end and having a first vertical section, a horizontal section, and a second vertical section, and a wide bore vertical section comprising said second manometer tube end, said wire bore vertical section communicating substantially directly with said enlarged volume portion of said second conduit.

6. The manometer of claim 1, in which said valve means means comprises a main body from which said pressure source tube depends and to the sides of which said first and second conduits and said vent tube are connected, said valve control element extending above said main body, the top of said main body being at a higher level than said manometer tube and said first and second conduits.

7. The manometer of claim 6, in which the end of said venting tube opposite from said valve means is located above said given level.

8. The manometer of claim 6, in which said manometer tube comprises a short horizontal section, a narrow bore extension comprising said first manometer tube end and having a first vertical section, a horizontal section, and a second vertical section, and a wide bore vertical section comprising said second manometer tube end.

9. The manometer of claim 6, in which said manometer tube comprises a short horizontal section, a narrow bore extension comprising said first manometer tube end and having a first vertical section, a horizontal section, and a second vertical section, and a wide bore vertical section comprising said second manometer tube end, said wide bore vertical section communicating substantially directly with said enlarged volume portion of said second conduit.

10. The manometer of claim 1, in which the end of said venting tube opposite from said valve means is located above said given level.

11. The manometer of claim 10, in which said manometer tube comprises a short horizontal section, a narrow bore extension comprising said first manometer tube end and having a first vertical section, a horizontal section, and a second vertical section, and a wide bore vertical section comprising said second manometer tube end.

12. The manometer of claim 10, in which said manometer tube comprises a short horizontal section, a narrow bore extension comprising said first manometer tube end and having a first vertical section, a horizontal section, and a second vertical section, and a wide bore vertical section comprising said second manometer tube end, said wide bore vertical section communicating substantially directly with said enlarged volume portion of said second conduit.

13. The manometer of claim 1, in which said manometer tube comprises a short horizontal section, a narrow bore extension comprising said first manometer tube end and having a first vertical section, a horizontal section, and a second vertical section, and a wide bore vertical section comprising said second manometer tube end.

14. The manometer of claim 1, in which said manometer tube comprises a short horizontal section, a narrow bore extension comprising said first manometer tube end and having a first vertical section, a horizontal section, and a second vertical section, and a wide bore vertical section comprising said second manometer tube end, said wide bore vertical section communicating substantially directly with said enlarged volume portion of said second conduit.

15. The manometer of claim 1, in which said valve means comprises a main body having first, second, third and fourth individual ports to which said first and second tube ends, said vent tube and said pressure source tube are connected respectively, said valve means control element comprising a unitary part effective in its first operative position to connect all said ports and effective in its second operative position to connect only said first and fourth ports.

References Cited

UNITED STATES PATENTS 3,313,157    4/1967    Gilson _____ 73—401

LOUIS R. PRINCE, *Primary Examiner.*

D. O. WOODIEL, *Assistant Examiner.*

U.S. Cl. X.R.

73—23; 333—11, 24.3, 7, 84